Figure 1:
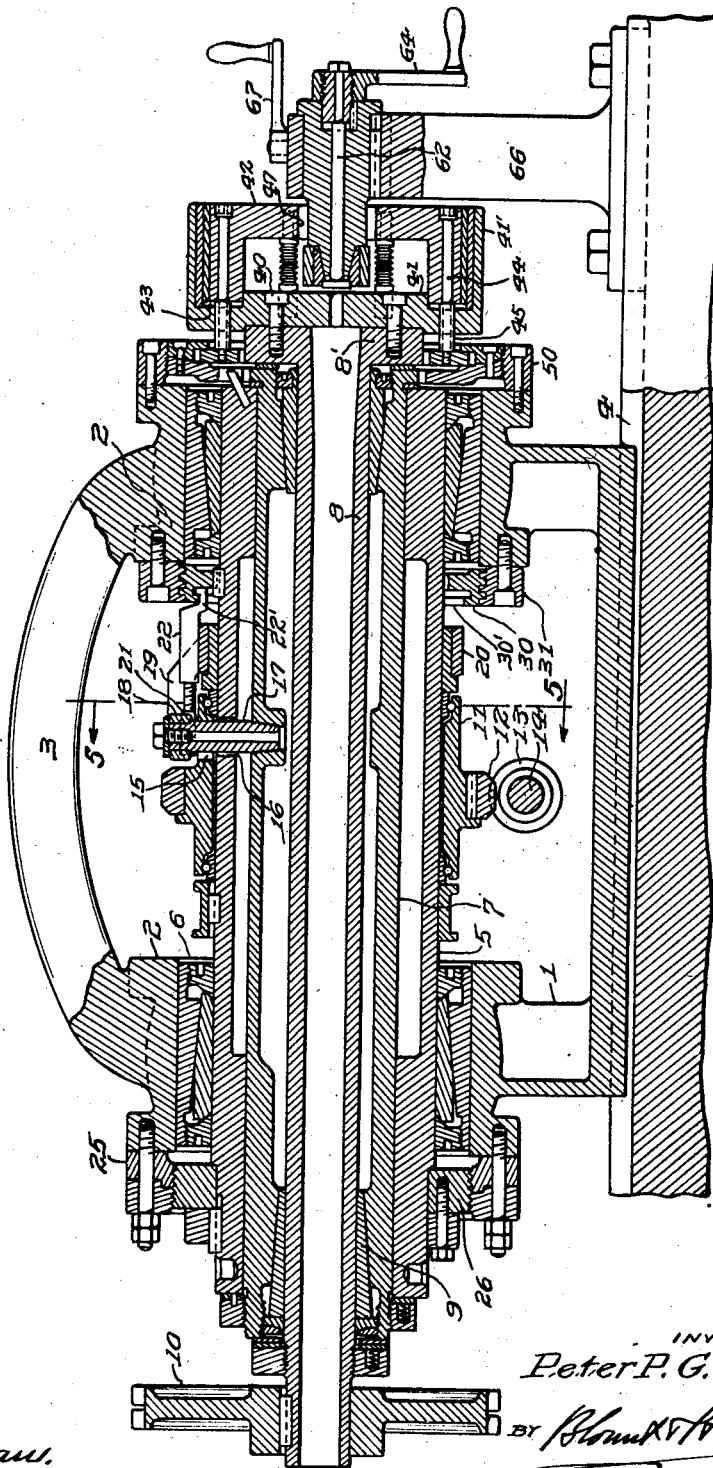

Feb. 28, 1933. P. P. G. HALL 1,899,865
MACHINE FOR MILLING THREADS
Filed Aug. 29, 1929 3 Sheets-Sheet 1

WITNESS
F. J. Hartman.

INVENTOR
Peter P. G. Hall.
BY
ATTORNEYS

Feb. 28, 1933. P. P. G. HALL 1,899,865
MACHINE FOR MILLING THREADS
Filed Aug. 29, 1929 3 Sheets-Sheet 2
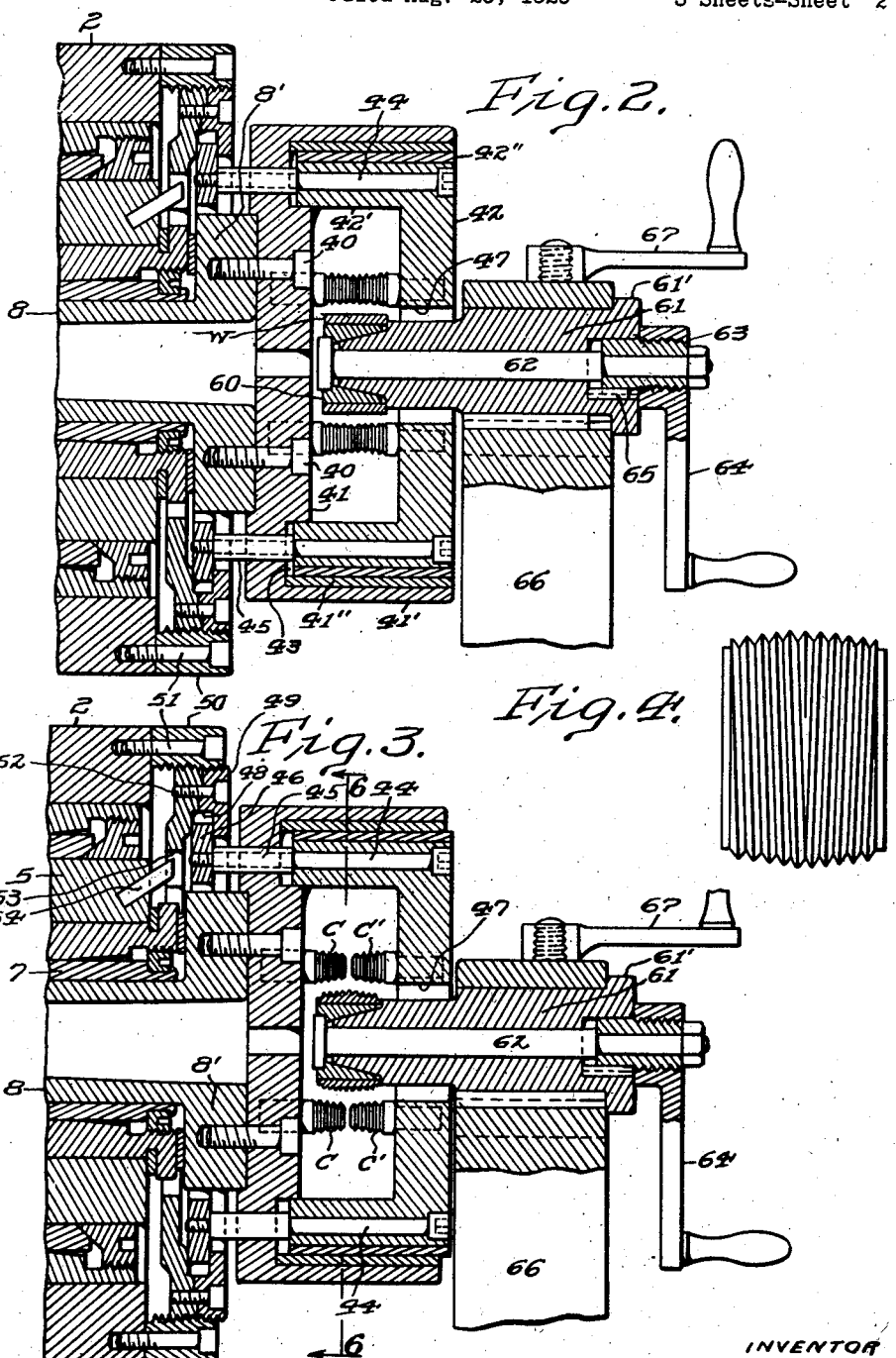
INVENTOR
Peter P. G. Hall Feb. 28, 1933.   P. P. G. HALL   1,899,865
MACHINE FOR MILLING THREADS
Filed Aug. 29, 1929   3 Sheets-Sheet 3

INVENTOR
Peter P. G. Hall.
ATTORNEYS

Patented Feb. 28, 1933

1,899,865

UNITED STATES PATENT OFFICE

PETER P-G. HALL, OF PHILADELPHIA, PENNSYLVANIA

MACHINE FOR MILLING THREADS

Application filed August 29, 1929. Serial No. 389,154.

The principal objects of the present invention are the provision of a novel machine for simultaneously forming external or internal threads of opposite pitch upon cylindrical articles.

A further object of the invention is the provision of a machine of the character aforesaid by means of which such threads, properly aligned with the axis of the threaded piece, can be produced with the accuracy and finish requisite for insuring a tight and properly fitting thread and more rapidly and consequently at a lower production cost than has heretofore been possible, so far as I am aware, by any machine heretofore designed for similar purposes.

Further objects, advantages and novel features of design, construction and arrangement comprehended by my invention are hereafter more particularly mentioned or will be apparent to those skilled in the art from the following description of a machine constructed in accordance with a preferred embodiment of the invention and illustrated in the accompanying drawings.

In certain aspects, my present invention may be regarded as an adaptation of the planetary metal-working machines disclosed in U. S. Letters Patent No. 1,316,718 granted to me September 23, 1919 and No. 1,507,235 granted to me September 2, 1924 and in the practice of the present invention I therefore prefer to make use of a machine of that character in combination with certain additional mechanism as hereinafter set forth. As more fully explained in the said patents as will appear by reference thereto, a machine constructed in accordance with the invention thereof is operative, among other things, to simultaneously impart to a threading cutter provided with teeth constituting a replica of the thread to be formed but without pitch, a rotative movement about its own axis, a planetary movement about the stationarily supported work, a longitudinal movement with respect to the said work and a slight and very gradual radial movement with respect thereto with resulting production of a continuous tapered spiral thread on the work, the said gradual radial movement of the cutter being employed, however, only in the formation of a tapered thread so as to compensate for the gradual and progressive variation in the radial magnitude thereof.

Therefore as the said patented machines have gone into extended use, are well understood by those familiar with the art and are fully disclosed in my said patents, I shall herein refer to the principal features and elements of construction thereof to such extent merely as will be requisite for a proper and adequate comprehension of the present invention.

Figure 5:
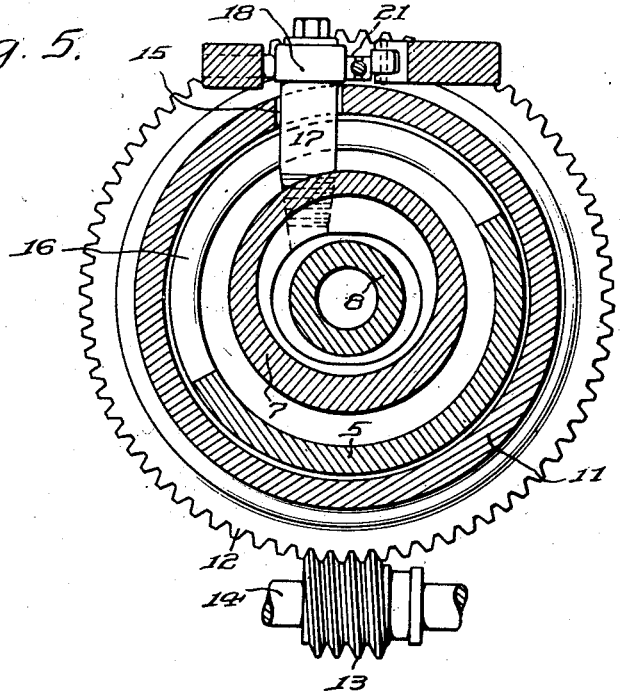
Figure 6:
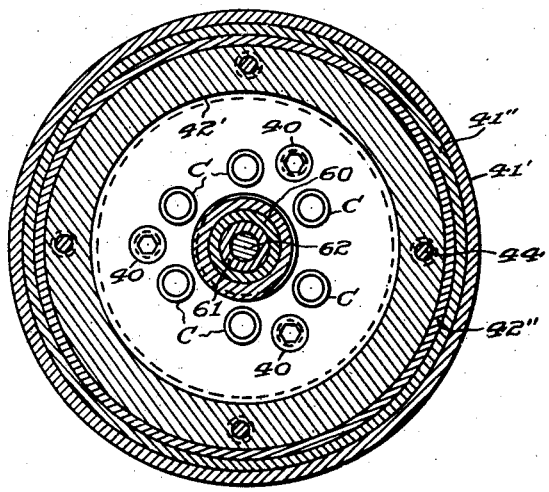

In the accompanying drawings, Fig. 1 is a longitudinal central section, with certain parts shown in elevation, of one of the patented machines having combined therewith the said certain additional mechanism in accordance with the present invention; Fig. 2 is a similar section, but on an enlarged scale, of the cutters and adjacent portions of the machine shown in Fig. 1 and with the parts in the same position, namely, that assumed prior to the actual cutting of the thread in the work, while Fig. 3 is a similar view but showing the same parts in the positions assumed after the completion of the thread. Fig. 4 is an enlarged side elevation of a radiator nipple after it has been threaded in the machine. Fig. 5 is a transverse section of the machine on an enlarged scale in a plane adjacent its longitudinal midpoint, looking toward the left of the machine as viewed in Fig. 1, and Fig. 6 is a transverse section through the cutter heads shown in Figs. 2 and 3 and looking toward the left thereof. The lines 5—5 in Fig. 1 and 6—6 in Fig. 3 indicate the planes of section of Figs. 5 and 6 respectively. The same characters of reference are used to designate similar parts in the several figures.

While the machines constructed in accordance with the present invention are adapted for threading numerous classes of work, they are particularly well suited for the simultaneous formation of tapered right and left-hand threads upon the opposite ends of a radiator nipple blank to thereby produce a finished radiator nipple such as is shown in Fig. 4, and I shall therefore herein refer more particularly to the employment of the machine to that purpose, such reference, however, being merely for convenience and not by way of limitation or restriction upon the manifold other uses of the machine.

To enable those skilled in the art to comprehend and practice the present invention, I shall first very briefly describe the principal features of construction and operation of the patented planetary milling machines to which I have hereinbefore referred and shall then point out with greater particularity the modifications which I make therein and the details of the additional mechanism which I combine therewith to thereby produce a machine adapted for the simultaneous production of threads of opposite pitch on a cylindrical blank in accordance with the method of the present invention.

In its commercial embodiment the said patented machine comprises among other things a unitary frame 1 provided with cylindrical horizontally aligned longitudinally spaced housings 2 tied together by a yoke 3; this frame is suitably mounted on a base 4. Extending through the housings is a hollow cylindrical main container 5 which is rotatably supported on bearings generally designated as 6 and which are preferably, as shown, of the split-bushing type to enable accurate initial adjustment and subsequent compensation for any wear which may take place, as it is necessary for the production of accurate work that all play or lost motion shall be eliminated as far as possible from these bearings. Within the main container and extending from one end to the other thereof for limited rotative movement therein is a hollow secondary container 7; this secondary container is eccentrically mounted within the main container as clearly shown in Fig. 1 and, in turn, surrounds the longitudinally extending cutter spindle 8 which is journaled for axial rotation in the secondary container on adjustable bearings generally designated as 9 and preferably of the split-bushing type so that any wear or lost motion between the spindle and secondary container can be readily taken up. The spindle is desirably made hollow for the passage of the coolant which, when the machine is in operation, is desirably pumped therethrough by suitable mechanism (not shown) and discharged over the cutters and the work, and is driven in any suitable way as through the medium of a gear 10 mounted on its rear end, which projects beyond the secondary container, and intermeshes with a driving pinion and other driving mechanism (not shown) or, if desired, the spindle may be driven by a belt in which case the gear is replaced with a pulley.

Between the housings 2 the main container is surrounded by a rotatable sleeve 11 suitably prevented from longitudinal movement relative to the sleeve and desirably mounted on ball bearings as shown in Fig. 1. This sleeve carries a worm gear 12 which meshes with a worm 13 on a shaft 14 extending transversely of the machine below the main container and which is suitably driven through a gear train and other mechanism (not shown) so as to effect rotation of the worm gear 12 and sleeve 11 to which the worm gear is keyed or otherwise suitably secured.

The sleeve 11 is provided with a radially directed hole 15 and the main container with a peripheral slot 16 aligned therewith, and through this hole and slot is extended a driving stud 17 whose inner end is threaded into the secondary container 7. Thus as the worm gear 12 is turned in one direction or the other, the driving stud 17 and secondary container 7 are constrained to move with the sleeve through coaction of the driving stud with the sleeve through which it extends, but so long as the movement of the stud does not exceed the length of the slot and main container is unaffected.

At its outer extremity the stud is provided with a head 18, conveniently in the form of a roll or block, adapted to engage a stop 19 carried on a band 20 surrounding the main container and adapted for rotative adjustment with respect thereto, means (not shown) being provided for clamping the band in any desired position with respect to the container so that the stop, band and container will form an operatively rigid unit. Interposed between the head 18 and the stop is a removable wedge 21 carried on a threaded stem which to facilitate adjustment can be screwed in or out of the adjacent end of a block 22 provided with a hook 22' at its opposite end; the function and purpose of these parts are hereinafter more fully described.

It will thus be apparent that when the shaft 14 is rotated so as to turn the worm gear 12 in a clockwise direction when the machine is viewed from its right hand or forward end as shown in Fig. 1, an initial rotative movement will be imparted by the sleeve 11 and drive stud 17 to the secondary container 7, this movement being operative through the eccentric mounting of the secondary container in the main container to cause the cutter which, as hereinafter described, is supported at the forward end of the cutter spindle, to be moved eccentrically in toward the work until the head 18 on the drive stud engages the stop 19 or, rather, the wedge 21 which, when employed, is interposed between the head 18 and the stop and lies against the latter whose supporting band 20 has previously been clamped in a position of rotative adjustment with respect to the main container such that the aforesaid engagement occurs just as the cutter attains proper depth in the work. Thereafter, through the medium of the driving stud 17, the main and secondary containers move unitarily so as to carry the cutter about the work in a planetary orbit and in the same relation thereto, i. e., at the same depth of cut, to which it was brought by the partial revolution of the secondary container in the main container before the latter started to revolve.

For the production of a straight thread no further relative rotative movement between the main and secondary containers is effected after the cutter has been brought to proper depth and the movement of the main container initiated, but when a taper thread is being cut a gradual further relative rotative movement of the secondary container with respect to the main container is progressively effected during the cutting operation by causing relative movement between the head 18 and stop 19 on one hand and the wedge 21 on the other so as to gradually move the head and the stop farther apart or to permit them to gradualy approach each other with the result that the cutter is correspondingly carried farther into the work in a generally radial direction or withdrawn therefrom in a similar direction so as to properly compensate for the progressive decrease or increase in the radial magnitude of the tapered thread which is being formed; the direction of movement of the cutter so effected, that is, whether it be moved toward the center of the work or withdrawn therefrom, is determined by the direction in which the cutter is being moved longitudinally of the work in the manner and by the means now to be described.

For effecting this progressive longitudinal movement of the cutter with respect to the work simultaneously with its planetary movement thereabout as just described the machine is provided with means comprising a master nut 25, desirably made in two parts as shown in Fig. 1 so as to facilitate compensation for any wear which may occur between its thread and those of an annular master screw 26 which is supported on and prevented from rotation with respect to the rear end of the main container, the master nut in turn being rigidly secured to the outer face of the rear housing 2. As the screw is prevented from longitudinal movement with respect to the main container, it will be apparent that as the latter is rotated it will be moved longitudinally through the coaction of the screw and master nut at a rate determined by the pitch of their cooperative threads and which of course corresponds with the pitch of the thread desired in the work.

As shown, the machine is also provided with means for gradually moving the cutter substantially radially of the work in taper threading operations, said means comprising a ring 30 having an undercut slot 30' in its inner face adapted to receive the hook 22' on the block 22 and on its outer periphery with a plurality of rings or collars respectively cooperative with corresponding grooves in the inner face of a ring 31 which is clamped to the rear face of the forward housing 2. The ring 30 surrounds the main container and is keyed thereto so as to rotate therewith although capable of longitudinal movement thereon with the result that as the container is moved longitudinally in one direction or the other through the operation of the master nut and master screw the head 18 and stop 19 are moved along the wedge so as to allow the head to approach the stop or to force the head away from the stop with resulting gradual relative rotative movement between the main container and eccentrically mounted secondary container for the purpose to which reference has heretofore been made. Of course, when cutting a straight thread, the wedge and block 22 are simply removed from the machine and the head 18 allowed to contact directly with the stop 19.

The machine is also ordinarily provided in addition to the mechanism heretofore briefly described with means for effecting a quick return of the containers to initial position after the completion of the thread on the work as well as with other features which, although desirable in connection therewith, require no description or illustration for a proper comprehension of the present invention.

I shall now refer more particularly to the modifications which in accordance with the present invention I incorporate in and the additional mechanism which I combine with a machine of the general character of that to which I have referred.

The spindle 8 is customarily provided at its forward end with a flange 8' drilled for the reception of bolts 40 by means of which a cutter head of any suitable type is operatively removably secured thereto, as best shown in Figs. 2 and 3 to which reference now may be more particularly had by reason of their showing of certain parts on a larger scale than Fig. 1, and in the normal use of the said machine for producing an ordinary thread the cutter head may comprise a circular plate provided with a plurality of annularly spaced cutter buttons each having teeth similar in profile to the desired thread but without pitch and, of course, when tapered threads are to be produced, properly tapered in accordance with the taper desired therein. In accordance with the present invention, however, this ordinary form of cutter is replaced with a circular plate 41 desirably countersunk on its rear face so as to seat over the adjacent end of the spindle flange 8', the plate of course being drilled for the passage of the bolts 40 in the usual way. This plate has a marginal flange 41' which is of relatively considerable depth and may be provided with an annular liner 41″; with its flange and liner, it constitutes the main cutter head and is adapted to receive and substantially enclose an auxiliary cutter head comprising a circular plate 42 having a peripheral flange 42′ surrounded by a liner 42″ and adapted to telescope within the liner 41″ with the flanges of the two plates extending in opposite directions. The plate 41 is desirably countersunk on its forward face adjacent the flange 41′ so as to form an annular groove 43 adapted to receive the adjacent extremity of the flange 42′ so that the auxiliary cutter head made up of the plate 42, flange 42′ and adjacent liner 42″ when fully telescoped within the main head may be moved for a relatively considerable distance away from the plate 41 without disengaging the end of flange 42′ from the groove 43; thus proper alignment between the two heads is insured throughout the extent of relative movement to which they are subjected in the operation of the machine.

The auxiliary head is operatively united to and prevented from relative rotation in the main head by a plurality of annularly spaced elongated studs 44 having heads at their outer ends desirably countersunk in the face of the plate 42; the studs extend through the flange 42′ and also through the plate 41 and at their inner ends are threaded into a ring 46 surrounding the flange 8′ of the spindle and spaced therefrom, while surrounding that portion of each stud lying between the flange 42′ and the ring is disposed a sleeve 45 against the ends of which the ring and the flange 42′ respectively abut, with the result that when the parts are in place, a definite and constant relation is maintained by the sleeves between the auxiliary head and the ring 46 although the sleeves are free to slide longitudinally in the bores in the plate 41 through which they extend. Desirably the liners 41″ and 42″ are respectively of such material that a good bearing surface is formed between them so that the auxiliary head can readily slide relatively to the main head while the center of the plate 42 is bored out to a suitable diameter to provide an opening 47 through which the work and its supporting arbor may be introduced as hereinafter described.

The cutter head plate 41 serves to support a plurality of annularly spaced cutters C and the plate 42 correspondingly supports a plurality of similar cutters C′ which are removably secured to the respective plates in any convenient way to extend oppositely inwardly therefrom. Each of these cutters is provided with a plurality of cutting teeth having the profile of the desired thread but without pitch, and the cutters are respectively tapered in their toothed portions in correspondence with the taper desired in the thread to be produced. When tapered right and left hand threads are being cut such as appear on the nipple shown in Fig. 4, the taper of the cutters C is opposite in direction to that of the cutters C′ as clearly shown in Figs. 2 and 3 so that the smaller ends of the former lie adjacent the corresponding ends of the latter. As cutters of this general type, and which are frequently referred to as "button type cutters", are in common use, no further description of them is required, nor of the means by which they are secured in their supporting plates as any means suitable for that purpose may be utilized. For convenience of illustration only two cutters have been shown on each plate, but it will be understood in practice a greater number of cutters are preferably employed on each of them and are arranged equidistantly from the centers of the plates in annularly spaced relation so as to form an interrupted ring of greater diameter than the blank to be threaded and thereby permit it to be freely inserted therein.

The ring 46 to which reference has been made seats in an annular groove 48 formed in the inner face of an annular master screw 49 the diameter of the bottom of the groove being sufficiently greater than the outer diameter of the ring 46 to provide clearance therebetween when relative eccentric movement between the ring and the master screw is effected in the operation of the machine. The master screw 49 is exteriorly threaded on its periphery with a master thread of the same pitch as that which is to be formed by the cutters C′; this screw is cooperative with an internally threaded annular master nut 50 which is secured as by bolts 51 to the forward face of the adjacent housing 2 in a manner generally similar to that in which the master nut 25 is secured to the rear face of the opposite housing. Desirably, the master screw is made in two parts as shown and operatively secured together by bolts 52 so as to facilitate compensation for wear between the threads of the screw and nut, and the said threads are preferably of opposite pitch to those of the master nut 25 and screw 26. The master screw surrounds but is out of contact with the adjacent flange 8′ of the cutter spindle 8 and is provided with a slot 53 in its inner face adapted to receive the projecting end of a driving pin 54, the other end of which is seated in a bore formed in the adjacent end of the main container 5 so that the master screw 49 is at all times constrained to turn with the main container whenever the latter is rotated in either direction.

It will be apparent from the foregoing that as the master nut 50 is stationary, the master screw 49 will be screwed in or out relatively to the adjacent housing 2 and main container whenever the latter is rotated, the direction of movement of the nut depending, of course, on the direction of the container's rotation; thus, as the ring 46 is constrained to move longitudinally with the nut and the auxiliary head maintained in definite relation with the ring, it results that the longitudinal movement of the master screw is communicated to the auxiliary cutter head, the studs 44 or, rather, the sleeves 45 surrounding, the studs sliding in the plate 41 as the auxiliary head moves in or out relatively to the main cutter head which, as the plate is secured to the spindle 8, is also constrained to move therewith. On the other hand, the auxiliary head through the medium of the studs 44 is constrained to rotate with the main head and cutter spindle when the latter turns in either direction so that both sets of cutters C and C' partake of the rotative movement of the spindle as it is driven on its own axis through the gear 10.

The blank W on which the thread is to be formed is stationarily supported with respect to the cutter heads in any convenient way by any suitable means. Thus, when the work is hollow as, for example, a radiator nipple blank, it may be disposed on an expanding sleeve 60 interiorly conically bored to engage the correspondingly coned nose of an arbor 61 through which extends a headed bolt 62 carrying at its outer extremity an externally threaded nut 63 cooperative with a crank 64 and prevented from rotation in the arbor by a key 65 in such manner that when the work is seated on the sleeve and the latter then drawn up and expanded on the nose of the arbor by means of the crank 64, the blank is properly centered on the arbor and also restrained from rotation with respect thereto. The arbor in turn is adapted to extend through and be clamped in a standard 66 seated on and rigidly secured to the base 4, the upper end of the standard being bored and split for the passage of the arbor and adapted to be contracted about the arbor after the latter is seated therein by a manipulation of a crank 67 or in any other suitable way. The means just described constitute a convenient mechanism for chucking and holding hollow cylindrical blanks as they can be quickly secured on the arbor when the latter is removed from the standard and the arbor in turn then readily secured in operative position in the standard, a flange 61' on the end of the arbor adapted to seat against the face of the standard being desirably provided to insure the arbor being pushed through the standard for the proper distance but not in excess thereof. It will be understood, however, that any other means for chucking and holding the blank in proper relation to the cutter heads may be employed if preferred, the details of construction thereof naturally varying in accordance with the particular form and kind of work on which the threading operation is to be performed.

Brief reference will now be made to the operation of the machine when constructed and assembled substantially as described:

Let us assume a hollow cylindrical radiator nipple blank is to be threaded with a taper right-hand thread on its left hand end and a taper left hand thread on its right hand as shown in Fig. 4. For this purpose, the blank is first positioned on the arbor as above described and the arbor then pushed into place and secured in position in the standard as shown in Fig. 2 so as to bring the blank in alignment with the cutters C, C' which at the initiation of the threading cycle are respectively in contact or substantially in contact at their adjacent inner ends as shown in said figure and in Fig. 1. It will be understood that the machine has previously been so adjusted by suitable relative rotation of the secondary container 7 with respect to the main container 5 that the axis of the cutter spindle 8 is substantially coincident with the axis of the blank with the result that the cutters C, C' are disposed symmetrically about the latter, and that the stud 17 has also been brought to and clamped in a position such that when the head 18 engages the wedge 21 the secondary container 7 will have rotated relatively to and in the main container sufficiently to bring the cutters C, C' in to depth or, in other words, to move the cutter heads eccentrically to the blank sufficiently to enable cutters to take the desired depth of cut. The shaft 14 is now set in motion in a direction to rotate the containers in a clockwise direction when the machine is viewed from the right hand end in Fig. 1, but it will be noted that the main container remains stationary while the secondary container initially revolves within it (with the cutter spindle rotating on its own axis within the secondary container through the drive imparted to the cutter spindle by the gear 10) until the cutters have been brought to depth at which time the rotation of the main container is initiated through engagement of the head 18 with the wedge 21 lying against stop 19. Until this movement of the main container is begun, no longitudinal movement is imparted to the cutters as the master screws are stationary in their respective master nuts, but as soon as the main container commences to revolve, the master screw 26 and nut 25 become operative to move the main and secondary containers, cutter spindle and main cutter head to the left when viewed as in Fig. 1 while, simultaneously, the master screw 49 and nut 50 correspondingly operate to move the auxiliary cutter head to the right relatively to the main head, the pitch of the master screw 26 and nut 25 on one hand and of the master screw 49 and nut 50 on the other being opposite to each other and thus effective to move the parts with which they are respectively connected and which they control in opposite directions during the rotation of the main container.

It is of course apparent that for the proper formation of the thread the cutter heads must move in opposite directions and it will usually be found more convenient to so arrange the master threads that the cutter heads will move away from each other so that the cutting of the thread on the blank will proceed simultaneously from the center toward the ends thereof in accordance with the procedure just described. However, under certain conditions it may be found more expedient to form the threads from the ends of the blank toward the center, in which case the threads of the respective master nuts and screws will be so arranged as to move the main and auxiliary cutting heads toward each other during the cutting operation; in such case, of course, the cutter heads are longitudinally separated instead of close together at the beginning of the cycle.

In accordance with the usual and generally preferred arrangement as is shown in the drawings, the master screw and nut, 26 and 25, controlling the movement of the main head, are provided with a right hand thread and the other master screw and nut controlling the movement of the auxiliary cutter head with a left hand thread with the result that a right hand thread is produced on the left hand end of the nipple when viewed as in Fig. 4 and a left hand thread on the right hand end thereof, both of the said threads being of the same pitch since the pitches of the master screws and nuts are similar. It will be appreciated, however, that the pitches of the latter are not necessarily similar but may be different in case it is desired to produce on one end of the blank a thread of one pitch and upon the opposite end a thread of another pitch.

In order to form a complete thread around the periphery of the blank it is desirable that the cutter heads make a little more than a complete, that is, 360°, planetary revolution about the stationarily supported work after the cutters have been moved in to full cutting depth and, when tapered threads are being cut, through the operation of the head 19, wedge 21 and stop 19, the cutters are gradually moved during this planetary movement substantially radially of the blank so as to compensate for the gradual variation in the radial magnitude of the taper threads. When the cutters, as shown, are arranged to cut from the center of the blank toward the ends thereof, the mechanism effective to bring about this radial movement is arranged so as to gradually move the cutters inwardly toward the center of the blank or, in other words, the wedge 21 is slowly withdrawn from between the head and the stop so as to permit the secondary container to gradually turn in the main container in the proper direction to move the cutters into the work, but when the cutters are arranged to cut from the ends of the blank toward the center thereof an opposite movement is imparted to the wedge so as to gradually turn the secondary container in reverse direction in the main container and thus withdraw the cutters radially of the blank.

It will thus be apparent that during the cutting operation the main head moves longitudinally relatively to the housing of the machine in a predetermined direction; that the auxiliary head also moves longitudinally relatively to said housing in the opposite direction; that both heads, after the cutters are moved in to depth, are given a planetary movement about the work while revolving on their own axes and, additionally, that when tapered threads are being cut the cutters are gradually moved to or from the work in a direction substantially radial thereof. The result of these combined movements is the production of threads of opposite pitch upon the opposite ends of the work, these threads being either of the same pitch per inch or of different pitches per inch in accordance with the similarity in or difference between the pitches per inch of the master threads and nuts respectively controlling the longitudinal movements of the cutter heads.

After the cutters have been carried about the work sufficiently to fully form the threads, the direction of rotation of shaft 14 is reversed by suitable mechanism (not shown) so as to first move the secondary container in reverse direction relatively to the main container to clear the cutters from the work as shown in Fig. 3, following which rotation of the main container in reverse direction is initiated either at the same speed at which it revolved while the thread was being formed or preferably at a higher speed so as to effect a quick return to initial position, this rotation of the main container of course serving, through the operation of the master screws and nuts, to also return the main and auxiliary cutter heads to such position as shown in Figs. 1 and 2. While this return is being accomplished or subsequent thereto the expanding arbor is released from the standard and the now threaded blank removed therefrom, thus completing the cycle.

It will of course be appreciated that a machine of the character herein described may be employed with equal facility for the production of internal threads in accordance with my novel method, for all that is required to adapt the machine for internal threading is to provide some suitable means for chucking and holding the work adjacent the cutter heads and to so modify the latter that the cutters are capable of entering the ends of the work from opposite directions so that after they have been moved eccentrically in to depth and the heads carried about the work in a planetary orbit they will be effective when moved longitudinally of the work, and also radially thereof in the case of tapered threads, to form the desired threads on the work in the manner heretofore described. As the modifications requisite for effecting this result will necessarily vary in accordance with the particular characteristics of the work which is to be threaded and may be readily effected by the exercise of the ordinary mechanical skill attributable to those familiar with the art to which the present invention relates, extended reference thereto would be superfluous.

Although I have herein referred more especially to a machine in which the master threads and nuts respectively controlling the longitudinal movements of the main and auxiliary cutter heads are of opposite pitch whereby the said heads are moved in opposite directions during the cutting operation and the threads of the work thus simultaneously progressively formed from the ends thereof toward the center or from the center toward the ends, under certain conditions it may be found expedient to employ master threads and nuts of the same pitch so as to move the cutter heads longitudinally in the same direction and thus progressively form one thread from one end of the work toward its center and the other thread from the center toward the opposite end. However, while such an arrangement is within the contemplation and purview of my invention, it is generally found less preferable since, particularly in the case where tapered threads are to be cut, it quite materially enhances the complication of the machine without improving the results attainable by the use of a machine such as herein disclosed and which is operative to move the cutter heads in opposite directions.

While I have herein described with considerable particularity one form of machine embodying my invention, I do not thereby desire or intend to limit or confine the latter thereto, as if desired, the details of design, construction and arrangement of the various elements of the machine may be varied in numerous particulars either to adapt it to different classes of work or for such other reasons as may be deemed expedient, without departing from the spirit and scope of the invention as defined in the appended claims.

Having thus described my invention, I claim and desire to protect by Letters Patent of the United States:

1. In a machine for milling threads, the combination of a rotatable main container, a secondary container eccentrically mounted in the main container, a cutter spindle rotatable in the secondary container, a pair of cutter heads carried by the cutter spindle and relatively longitudinally movable with respect to each other, means for driving the cutter spindle, means for partially revolving the secondary container in the main container and for rotating the main container, means operative to move the main container, the spindle and one of said heads in a predetermined longitudinal direction when the main container is rotating, and means operative to move the other head longitudinally in a predetermined direction simultaneously with the movement of the first head.

2. In a machine for milling threads, the combination of a rotatable main container, a secondary container eccentrically mounted in the main container and capable of limited rotation therein, a cutter spindle rotatably mounted in the secondary container, means for driving the cutter spindle, means for rotating the secondary container in the main container and for thereafter driving both containers as a unit, a pair of relatively longitudinally movable cutter heads carried by the cutter spindle and rotatable therewith as a unit, a master screw and nut operative when the main container is rotating to impart longitudinal movement thereto in one direction to thereby move the spindle and one of said heads in such direction, another master screw and nut interconnected with the other head, and means for driving said screw from the main container to thereby longitudinally move said other head in the opposite direction simultaneously with the longitudinal movement of the first mentioned head.

3. In a machine for milling threads, the combination of a rotatable main container, a cutter spindle extending within the main container and rotatable relatively thereto, means for driving the cutter spindle, means for rotating the main container, a pair of opposed cutter heads carried by said spindle and longitudinally movable with respect to each other, means for causing both of said heads to rotate with the spindle, means operative to move the main container, the spindle and one of said heads longitudinally when the main container is rotating, and means operative to similarly move the other head under like conditions but in the opposite direction.

4. In a machine for milling threads, the combination of a rotatable main container, a cutter spindle extending within the main container and rotatable relatively thereto, means for driving the cutter spindle, means for rotating the main container, a pair of opposed cutter heads carried by said spindle and longitudinally movable with respect to each other, means for causing both of said heads to rotate with the spindle, a master screw and nut operative to move the main container, the spindle and one of said heads longitudinally when the main container is rotating, and another master screw and nut operative to similarly move the other head under like conditions but in the opposite direction.

5. In a milling machine, the combination of a rotatable main container, a cutter spindle rotatable within said container, means for driving the cutter spindle, means for rotating the main container, a pair of cutter heads carried by the spindle, disposed in opposed relation and arranged for longitudinal telescopic movement one within the other, means for causing both cutter heads to rotate with the spindle, means for moving the main container, cutter spindle and one of the said cutter heads longitudinally at a predetermined rate of progression when the main container is rotating, and means operative from said container adapted to move the other cutter head longitudinally in the opposite direction under like conditions and at a similar rate of longitudinal progression.

6. In a machine for milling threads, the combination of a rotatable main container, a cutter spindle rotatable within the main container, means for driving the cutter spindle, means for rotating the main container, a pair of cutter heads carried by the spindle, each of said heads comprising a plate having a peripheral flange disposed in telescopic arrangement with the flange of the plate of the other head, means for constraining said heads to rotate as a unit with the spindle but operative to permit longitudinal movement between the heads, means for moving the main container, cutter spindle and one of said heads longitudinally in a predetermined direction when the main container is rotating, and means actuated from the main container for moving the other head longitudinally in the opposite direction under like conditions.

7. A machine for simultaneously milling threads of opposite pitch on different portions of a piece of work, comprising a cutter head provided with a cutting element adapted to operate on one of said portions, means for rotating the head on its own axis, means for moving the cutting element eccentrically into the work, a second cutter head carried by said first-mentioned head in non-rotatable relation thereto and provided with a cutting element adapted for eccentric movement into another portion of the work simultaneously with said eccentric movement of said first-mentioned element, means operative to effect rotation of the first-mentioned head about its axis to thereby impart to the elements carried by both heads a planetary movement about the work, and means operative contemporaneously with said last-mentioned means to effect relative axial movement between said heads.

8. A machine for simultaneously milling threads of opposite pitch on different portions of a piece of work, comprising a cutter head provided with a plurality of cutting elements adapted to operate on one of said portions, means for rotating the head on its own axis, means for moving the cutting elements eccentrically into the work, a second cutter head disposed adjacent said first-mentioned head in non-rotatable relation thereto and provided with a plurality of cutting elements adapted for eccentric movement into another portion of the work during the eccentric movement of said first-mentioned elements, means operative to effect rotation of the first-mentioned head about its axis to thereby impart to both sets of elements a planetary movement about the work, and means operative contemporaneously with said last-mentioned means to effect relative axial movement between said cutter heads.

9. In a milling machine, a pair of interengaging rotatable cutter heads, a cutting element carried by each head at a point radially offset from the axis thereof, and extending toward the other head, means operative to maintain said heads in interengaged relatively non-rotatable relation, means operable to effect relative axial movement of one of said heads with respect to the other, and means operable to effect rotation of said heads about their axes to thereby simultaneously move the cutting elements in a planetary path.

10. In a machine for simultaneously milling threads of opposite pitch on different portions of a piece of work, a pair of rotatable cutter heads, a cutting element carried by each of said heads, means operative to maintain said heads in non-rotatable relation, means operative to effect eccentric movement of said elements respectively into said different portions of the work and means operative to effect rotation of one of said heads on its axis to thereby move said elements in a planetary path about the axis of the work.

11. In a machine for simultaneously milling threads of opposite pitch on different portions of a piece of work, a pair of rotatable cutter heads, a cutting element carried by each of said heads, means operative to maintain said heads in non-rotatable relation, means operative to effect eccentric movement of said elements respectively into said different portions of the work, means operative to effect rotation of one of said heads on its axis to thereby move said elements in a planetary path about the axis of the work, and means operative to effect relative axial movement of one of said heads with respect to the other during said rotation.

In witness whereof I have hereunto set my hand this 27th day of August, 1929.

PETER P-G. HALL.